Oct. 27, 1953         P. A. JENNINGS         2,657,130
           HIGH-TEMPERATURE STEEL AND ARTICLES
                  Filed Dec. 31, 1952
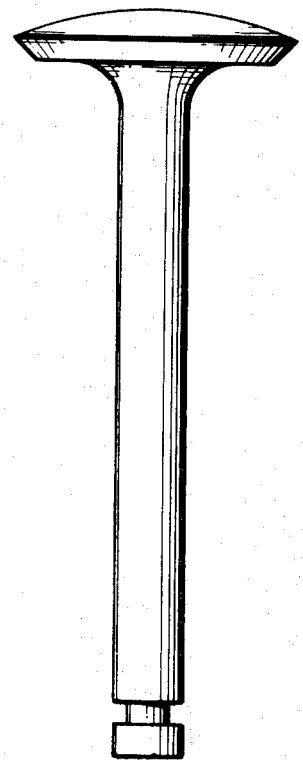
C:   0.08% – 1.50%
CR:  12% – 30%
NI:  2% – 35%
MN:  3% – 12%
SI:  PREF. 0.45% MAX.
N:   0.06% – 0.60%
FE:  BALANCE
INVENTOR
PAUL A. JENNINGS.
BY
HIS ATTORNEY Patented Oct. 27, 1953

2,657,130

UNITED STATES PATENT OFFICE 2,657,130

HIGH-TEMPERATURE STEEL AND ARTICLES

Paul A. Jennings, Baltimore, Md., assignor to Armco Steel Corporation, a corporation of Ohio Application December 31, 1952, Serial No. 328,881

7 Claims. (Cl. 75—128)

This application is a continuation in part of my co-pending application Serial No. 192,932 filed October 30, 1950, now abandoned, and entitled High Temperature Articles, which application is a continuation of my U. S. Letters Patent 2,602,738 which issued on an application filed January 30, 1950, as a continuation in part of my then co-pending application, Serial No. 19,480 filed April 7, 1948, now Patent 2,495,731 of January 31, 1950, which is a continuation-in-part of my then copending application, Serial No. 789,976 filed November 19, 1947, now abandoned, which in turn is a continuation-in-part of my application, Serial No. 762,863 filed July 23, 1947, also abandoned, and the invention relates to high temperature stainless steel articles, especially to articles in the form of valves, valve parts and other internal combustion engine components intended for use while hot in corrosive atmospheres.

Among the objects of my invention is the provision of strong, tough and durable austenitic stainless steel valves and other internal combustion engine components for elevated temperature use, which steel products, in view of the excellent properties of the particular steel employed function in a highly satisfactory manner in such fields as passenger car, truck, aircraft, diesel and marine vessel engine use, and which offer great hardness at the high temperatures encountered in use, and substantial resistance, in the heated condition, to hot corrosive atmospheres such as those containing the combustion products of anti-knock gasolines illustratively of the tetra-ethyl lead variety.

Other objects of my invention in part will be obvious and in part pointed out more fully hereinafter.

The invention accordingly consists in the combination of elements, composition of materials and features of products, and in the relation of each of the same to one or more of the others as described herein, the scope of the application of which is indicated in the following claims.

The single figure of the accompanying drawings represents a specific product and steel composition thereof falling within the scope of my invention.

As conductive to a clearer understanding of certain features of my invention, it may be noted at this point that a great variety of heretofore known valves and valve parts intended for use as operating components of internal combustion engines or the like have become obsolete for such reasons as increased engine temperatures incident to greater engine power and speed. In average passenger cars, for example, the temperature encountered by the valves frequently are as high as 700 degrees F. or more at the fuel intake position, and as high as 1100 degrees F. to 1450 degrees F. or more at the exhaust position. These temperatures ordinarily are even higher in truck, bus, marine vessel or aircraft engines, especially in the region where the exhaust valves operate.

Low-alloy steel valves, for example, which formerly operated satisfactorily in internal combustion engines now are found in most instances to be unacceptable, and particularly so on the exhaust side of these engines. The valves usually burn or warp very quickly at the high operating temperatures, thus impairing engine efficiency and requiring frequent replacement. While hot, the working parts commonly develop oxide scale which detrimentally affects proper seating. In turn, failure of the valve to seat properly allows leakage or blow-by of the hot gases, thus increasing the valve temperature and burning away the metal. An example of this type valve is one containing about 0.45% carbon, 8.50% chromium, 3.25% silicon, and the remainder substantially all iron.

Also, most of the low-alloy steel valves, including those having the composition just noted, are extremely susceptible to active corrosive attack by leaded fuels and particularly by the hot combustion products of these fuels. There are anti-knock fuels containing lead on the market, which, when consumed, not only exert a ruinous effect upon steel valves of low-alloy content, but a great majority of relatively high-alloy steel valves and parts likewise suffer great detriment and rapid deterioration when exposed to the fuel combustion products.

A number of stainless steel valves, and valves made of other high-alloy metal, for example, have been introduced for better servicing present-day needs. Some of these are of ferritic grade steel. Others are martensitic. In some, there is a high-silicon content and, as a result, they enjoy adequate scaling resistance. Unfortunately, however, they have poor resistance to lead compounds and are decidedly inferior in matters of hot-hardness and stretch resistance under certain operating conditions.

There are still other valves in the prior art, these being of austenitic chromium-nickel stainless steel grade. The amounts of silicon in the conventional austenitic steel products range from about 0.50% to 4.0% or more. In general, the austenitic steel valves have a more favorable lattice structure for resisting stress-rupture and creep at elevated temperatures than do the ferritic or martensitic products. It is also true that the relatively high-alloy content of the chromium-nickel austenitic steel favors resistance to scaling from heat at engine temperatures. A further advantage often arising from austenitic steel valve products is their freedom from phase transformation and, in this respect, freedom from volume changes and any resulting tendencies such as warping, sticking or cracking during the heating and cooling cycles brought about by the heat engine and its operation. The many valves of this character in the prior art, however, leave much to be desired of resistance to corrosive attack by hot lead compounds.

An outstanding object of my invention, accordingly, is the provision of high temperature heat-resistant, corrosion-resistant stainless steel valves, valve parts and internal combustion engine components having substantial strength at the temperatures of use, which are substantially free of phase transformation, are hot hard, resist stretch, and efficiently and reliably resist oxidation in the presence of heat and leaded fuel combustion products.

Referring now more particularly to the practice of my invention, I provide low-silicon, high-nitrogen austenitic chromium-nickel-manganese stainless steel internal combustion engine valves, valve parts, and any of other internal combustion engine components made of the steel, illustratively intake or exhaust poppet valves, stems, heads, springs, casings, claddings, linings or surfacings. In preferred composition, my products include about 0.08% to 1.50% carbon, from 12% to 30% chromium, 2% to 35% nickel, amounts of manganese ranging from 3% to 12%, with the silicon content not exceeding 0.25%, with nitrogen from 0.06% to 0.60%, and the remainder substantially all iron. Preferably, for desired hardness at the high temperatures encountered in actual use, the carbon content amounts to some 0.40% to 1.50%. By keeping an appreciable manganese content, and the silicon content below about the 0.25% figure, I find sharp improvement in resistance of the steel products to corrosion and attack by products of combustion resulting from the burning of leaded fuel. At about 0.15% silicon and on down to 0.10% or less, this improvement is even more pronounced, and the hot hardness is not adversely affected. Both the hot-hardness and corrosion-resistance are even more favorable where the carbon exceeds about 0.40% and the silicon ranges from about 0.15% on down substantially to zero in amount. The smaller quantities of silicon accordingly are usually preferred.

The inclusion of manganese results from my discovery that nickel in steels of the stainless grade often has an adverse affect upon the corrosion resistance of valve products while the latter operate in the presence of hot lead compounds. By supplanting the nickel ordinarily required for providing a steel of austenitic quality with manganese an austenitic balance steel is had and the adverse effect of nickel upon corrosion resistance in the combustion products of leaded fuels is importantly dispelled. Moreover, it seems that the steel of high manganest content has a greater solubility for carbon and as such permits greater hot hardness as higher temperatures are achieved.

Moreover, I use the element nitrogen in amounts up to about 0.30% to 0.40%, or even up to about 0.60%, as a substitute for an equivalent amount of nickel in the steel, in which event the carbon content may be as low as 0.08%. The nitrogen serves the function of increasing the hot-hardness of the steel. It also serves as a partial substitute for other austenite-forming elements to maintain the austenitic balance. Also, as times, I substitute the element cobalt in discreet amounts for one or more of the austenite-forming elements, manganese, nickel and carbon. There are occasions too where my stainless steel products include in the alloy composition thereof, as for special purposes, one or more such elements as molybdenum, titanium, columbium, tungsten, vanadium, copper, tantalum, aluminum, zirconium, or the like, ranging from quite small amounts to substantial amounts not inconsistent with properties desired.

The stainless steel valves, valve parts and engine components which I provide have a sulphur content which may be some quantity below 0.04%, or even as much as 0.2% or more. The larger quantities of sulphur, and especially those between about 0.15% to 0.20%, contribute to the effect of the low-silicon content in promoting resistance to attack by the combustion products of leaded gasolines and the like. The larger quantities of sulphur, say those beyond about 0.04%, and especially from 0.04% to 0.15%, usually improve the machining properties of the steel. Amounts of sulphur much beyond 0.20% often introduce hot working difficulties with certain of the austenitic steels which I employ; also, the rate of improvement of resistance to lead oxide corrosion usually decreases for these greater amounts. The phosphorus content of my products preferably is below about 0.04%.

The particular amounts of such elements as chromium, nickel and manganese present in the internal combustion engine products which I provide assure excellent heat resistance and resistance to oxidation at the high temperatures encountered. Also, the inclusion of manganese, and the restriction of silicon to the critically small amounts indicated, contribute to corrosion resistance of the products, in the combustion products of leaded fuels, as where the steel takes the form of an exhaust valve or part exposed to aircraft, truck or passenger car engine exhaust gases. By virtue of the austenitic quality of the steel, my valve products suffer substantially no phase transformation during heating and cooling cycles and, accordingly, are free of volume changes and difficulties often following upon change of phase. The valves are strong, tough and hot hard at the high temperatures encountered. They resist scaling, warping and cracking at full temperature and upon being cooled and reheated.

The effect of a purposeful nitrogen addition upon hot-hardness is demonstrated by the comparative figures given in Table I below. The samples analyze approximately 21% chromium, 4% nickel, 9% manganese, 0.10% silicon, .60% carbon, with varying nitrogen contents and remainder iron. All samples were heated at about 2150 degrees F. for one hour, then water-quenched, and finally aged at a temperature of about 1350 degrees F. to 1400 degrees F. The hot-hardness tests were made with a cold ball penetrator at 1400 degrees F. and are reported in Brinell numbers. The corrosion tests were made by immersing the samples in molten lead oxide contained in a new magnesia crucible at a temperature of 1675 degrees F. for one hour, the weight loss being reported in grams per square decimeter.

TABLE

*Influence of nitrogen on hot-hardness and resistance to lead oxide of chromium-nickel-manganese steel*

| Sample | C | Cr | Ni | Mn | Si | N | Hot Hardness 1,400° F. | Wt. Loss 1,675° F. |
|---|---|---|---|---|---|---|---|---|
| D | .435 | 21.59 | 4.12 | 8.28 | .42 | | 110 | |
| K (usual nitrogen) | .61 | 21.43 | 4.29 | 8.30 | .08 | .055 | 145 | 19.02 |
| L | .55 | 21.54 | 4.44 | 8.10 | .12 | .101 | 152 | 20.84 |
| M | .57 | 20.70 | 4.41 | 8.70 | .11 | .191 | 161 | 21.38 |
| N | .53 | 20.86 | 4.50 | 8.80 | .11 | .230 | 161 | 22.19 |
| O | .61 | 20.22 | 4.42 | 8.70 | .07 | .270 | 170 | 19.55 |
| P | .60 | 20.43 | 4.56 | 9.93 | .15 | .530 | 205 | 18.84 |

In the table, it is noted that Sample K, with nitrogen in the amount commonly found in stainless steel (up to about 0.05%), has a hot-hardness of about 145 Brinell. Where substantial quantities of nitrogen are introduced, the hardness substantially increases. For example, with a nitrogen content of about 0.10%, Sample L, the hardness amounts to 152, with 0.19% and 0.23% nitrogen, Samples M and Ni, it is 161, with 0.27%, Sample O, it is 170, with a nitrogen content of 0.53% the hot-hardness is 205 Brinell. Nitrogen, therefore, clearly increases the hot-hardness of my steel, and this without sacrifice of the corrosion-resisting properties.

Thus it will be seen that in this invention there are provided low-silicon high-nitrogen austenitic chromium-nickel-manganese stainless steel articles and products, in which the various objects noted hereinbefore together with many thoroughly practical advantages are successfully achieved. It will be seen that the products are well suited for resisting corrosion in the presence of combustion products of leaded fuels.

While certain of the articles which I provide take the form of internal combustion engine valves, valve parts and other internal combustion engine components, it will be understood that certain advantages of the invention are had from other products of the low-silicon steel, among which are high temperature gas turbine nozzles, turbine parts adjacent to the nozzle, and any of a variety of supercharger components.

And while I enjoy all of the benefits of my invention in the steel described above, certain benefits, including those of great hardness at high temperatures, nevertheless are enjoyed even where the silicon content is not restricted to the maximum figure of 0.45% but is present in amounts up to 4.0% or more.

As many possible embodiments may be made of my invention, and as many changes may be made in the embodiment hereinbefore set forth, it will be understood that all matter described herein is to be interpreted as illustrative and not as a limitation.

I claim as my invention:

1. Stainless steel having a hardness exceeding 145 Brinell at a temperature of 1400 F., and consisting essentially of about 0.08% to 1.50% carbon, 12% to 30% chromium, 2% to 6% nickel, 3% to 12% manganese, .06% to 0.60% nitrogen, all in such proportions as to assure a substantially fully austenitic structure, with the remainder substantially all iron.

2. Stainless steel having a hardness exceeding 145 Brinell at a temperature of 1400° F. and substantial resistance to corrosion in the presence of leaded fuel combustion products, and consisting essentially of about 0.08% to 1.50% carbon, 12% to 30% chromium, 2% to 6% nickel, 3% to 12% manganese, .06% to 0.60% nitrogen, all in such proportions as to assure a substantially fully austenitic structure, silicon not exceeding 0.45%, and the remainder substantially all iron.

3. Austenitic stainless steel having a hardness exceeding 145 Brinell at a temperature of 1400° F. and substantial resistance to corrosion in the presence of leaded fuel combustion products, and consisting essentially of about 0.08% to 1.5% carbon, 19% to 23% chromium, 2% to 5% nickel, 3% to 12% manganese, .06% to 0.60% nitrogen, silicon not exceeding 0.25%, and the remainder iron.

4. Austenitic stainless steel having a hardness exceeding 145 Brinell at a temperature of 1400° F. and substantial resistance to corrosion in the presence of leaded fuel combustion products, and consisting essentially of about 0.08% to .7% carbon, 19% to 23% chromium, 2% to 6% nickel, 7% to 11% manganese, .1% to .4% nitrogen, silicon not exceeding 0.25%, and the remainder iron.

5. Austenitic stainless steel internal combustion engine exhaust valve consisting essentially of approximately 0.08% to 1.50% carbon, 19% to 23% chromium, 2% to 6% nickel, 3% to 12% manganese, .06% to .60% nitrogen, and the remainder iron.

6. Austenitic stainless steel internal combustion engine exhaust valves consisting essentially of approximately 0.08% to 1.50% carbon, 19% to 23% chromium, 2% to 6% nickel, 3% to 12% manganese, .06% to .60% nitrogen, silicon not exceeding 0.45% and the remainder iron.

7. Austenitic stainless steel internal combustion engine exhaust valves consisting essentially of approximately 0.08% to .7% carbon, 20% to 22% chromium, 2% to 5% nickel, 3% to 12% manganese, .1% to .5% nitrogen, silicon not exceeding 0.25%, and the remainder iron.

PAUL A. JENNINGS.

References Cited in the file of this patent

UNITED STATES PATENTS

| Number | Name | Date |
|---|---|---|
| 2,225,440 | Becket | Dec. 17, 1940 |
| 2,438,824 | Rich | Mar. 30, 1948 |
| 2,495,731 | Jennings | Jan. 31, 1950 |
| 2,602,738 | Jennings | July 8, 1952 |